Aug. 23, 1960 — L. L. CHIERO — 2,949,635
SEAL MOLDING APPARATUS
Filed Feb. 26, 1957 — 2 Sheets-Sheet 1
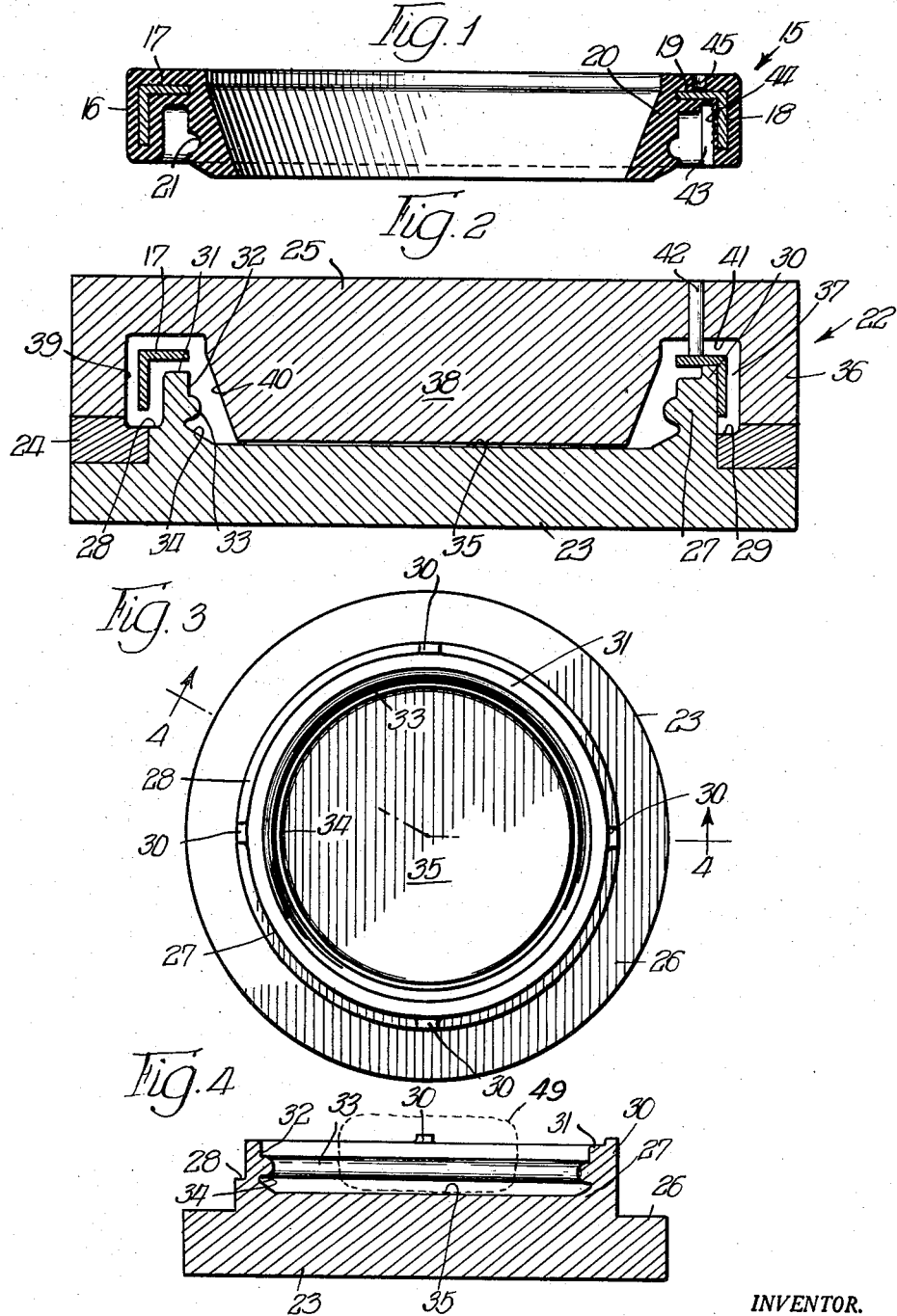
INVENTOR.
Louis L. Chiero,
BY Cromwell, Greist + Warden
ATTYS.

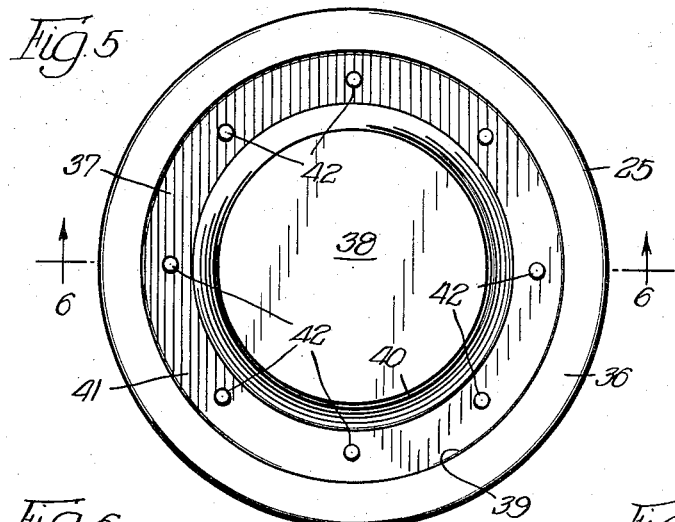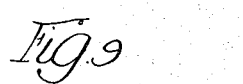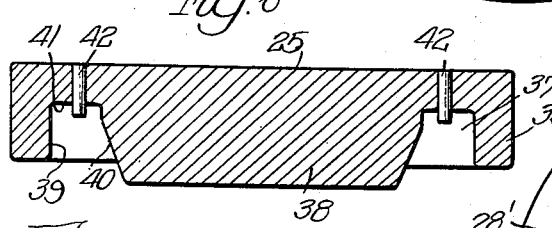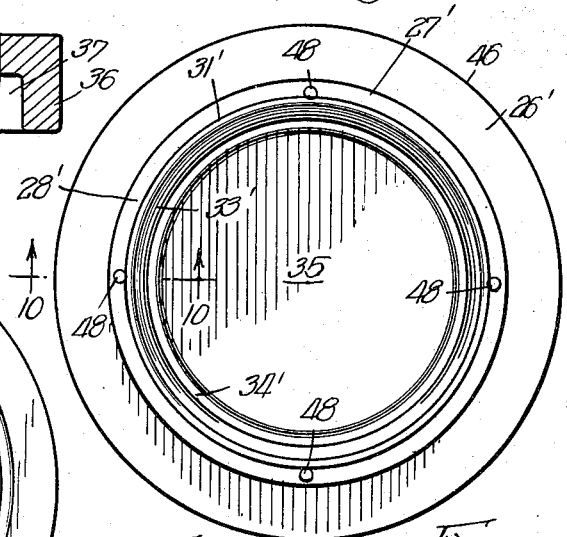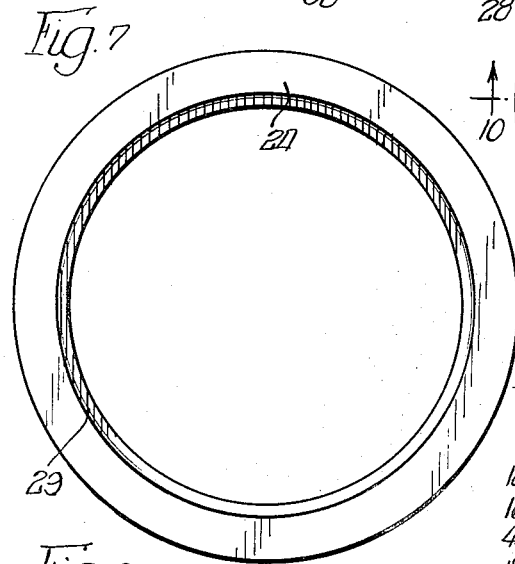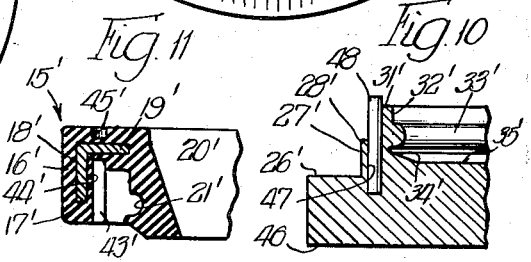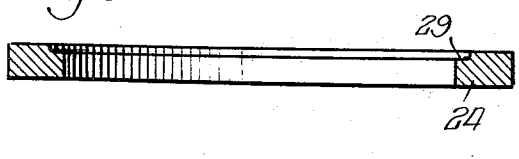

United States Patent Office 2,949,635
Patented Aug. 23, 1960

2,949,635

SEAL MOLDING APPARATUS

Louis L. Chiero, Chicago, Ill., assignor to Chicago Rawhide Manufacturing Company, Chicago, Ill., a corporation of Illinois Filed Feb. 26, 1957, Ser. No. 642,470

2 Claims. (Cl. 18—36)

The present invention is directed to apparatus for molding or forming a radially acting, shaft type seal having a reinforcing stamping imbedded therein.

Reinforcing stampings have been used extensively in the formation of radially acting, shaft type seals for the purpose of providing the body portion of said seals with the requisite rigidity and strength. The entire seal being formed from rubber or rubber-like material is normally provided with either a metallic stamping attached to the body portion thereof or at least one casing member attached to the body portion to hold the same rigidly for seal mounting and positioning purposes. Stampings or casing members have generally been attached to the rubber or rubber-like material of the body portion by cementing, thus resulting in at least a portion of the stamping or casing member being exposed.

In order to prepare the stamping for cementing to the material of the seal, it has been found necessary to subject the same to a number of special treatments to condition the surface or surfaces of the stamping to be cemented to allow the obtaining of permanent attaching through cementing to the rubber or rubber-like material. In other words, special cleaning and surface preparation treatments are necessary in order for the cementing material to properly adhere to the metallic surface of the stamping.

The stamping preparation treatments very often include two separate de-greasing treatments and two separate sandblasting treatments in order to properly condition the surfaces to be cemented. Such treatments materially add to the over-all cost of manufacture of a seal, and if these treatments are not carried out under carefully controlled conditions, the number of rejected seals is materially increased.

Still another objection arising from the cementing of reinforcing stampings to the body portions of seals resides in the difficulty experienced in obtaining complete adherence between the rubber material and the metal stamping along the joined edges of the same. Where slight separation occurs between the material of the seal and the stamping, it is possible for the flexible material of the seal to be peeled from the stamping. In order to prevent the possibility of peeling occurring, it is necessary to take great care in cementing the stamping to the seal.

It is an object of the present invention to overcome the disadvantages and difficulties accompanying the cementing of a metallic stamping to the body portion of a seal by providing seal forming apparatus capable of forming a seal with the reinforcing metallic stamping thereof imbedded in the material of the seal.

A further object is to provide seal molding apparatus the use of which eliminates the necessity of pre-conditioning and pre-treating a reinforcing stamping in line with cementing procedures, the apparatus materially improving the seal forming process by being provided with means for imbedding the reinforcing stamping in the material of the seal in such a manner that the stamping is completely covered by the material of the seal and permanently forms a part thereof.

Other objects not specifically set forth will become apparent from the following detailed description made in conjunction with the drawings wherein:

Fig. 1 is a vertical section of a molded, radially acting, shaft type seal formed by the apparatus of the present invention;

Fig. 2 is a vertical section of a closed seal forming mold of the present invention with a metal stamping mounted therein just prior to the formation of a seal thereby;

Fig. 3 is a top plan view in reduced scale of the bottom die member of the apparatus of the present invention;

Fig. 4 is a vertical section of the bottom die member of Fig. 3 taken generally along line 4—4 in Fig. 3;

Fig. 5 is a bottom plan view in reduced scale of the top die member of the apparatus of the present invention;

Fig. 6 is a vertical section of the top die member taken generally along line 6—6 in Fig. 5;

Fig. 7 is a top plan view in reduced scale of a stripper ring forming a part of the apparatus of the present invention;

Fig. 8 is a vertical section of the stripper ring of Fig. 7;

Fig. 9 is a top plan view of a modified form of bottom die member;

Fig. 10 is a sectional view of the modified form of bottom die member taken generally along line 10—10 in Fig. 9; and Fig. 11 is a fragmentary vertical section of a radially acting, shaft type seal formed by apparatus utilizing the modified bottom die member of Fig. 9.

In Fig. 1 a radially acting, shaft type seal 15 is illustrated as including an inverted L-shaped body portion 16 in which is imbedded a complementarily shaped reinforcing stamping 17 including an axially directed flange portion 18 integrally formed with a radially inwardly directed flange portion 19. The inner periphery of the annular body portion 16 has formed therewith a sealing lip portion 20 having an annular groove 21 about the outer periphery thereof which forms a seat for a continuous coil spring in the known manner. The seal 15 insofar as its shape and function are concerned is entirely conventional, the improved feature of the same residing in the complete imbedding of the annular reinforcing stamping 17 within the material of the body portion 16. The seal 15 may be formed from any suitable rubber or rubber-like material and, as included within the scope of the present invention, any radially acting shaft type seal may be improved upon in connection with the imbedding therein of the annular stamping by use of the molding apparatus to be described.

Fig. 2 illustrates a closed mold 22 being formed from a bottom die member 23, a stripper ring 24 and a top die member 25. Figs. 2–4 illustrate the structural features of the bottom die member 23 which is in the form of a cylindrical plate being provided with a peripheral, radially inwardly recessed shoulder 26 and an annular raised central portion 27. The raised central portion 27 defines an annular seal molding portion, the outer side surface of which is formed with an interrupted annular shoulder 28. As shown in Fig. 2, the shoulder 26 receives thereon in resting engagement the stripper ring 24, the inner periphery of which aligns itself with the shoulder 28. Referring to Figs. 7 and 8, the stripper ring 24 is provided with an inner recessed shoulder portion 29 which becomes aligned with the shoulder 28 of the bottom die member 23 to combinedly define an end surface of the body portion 16 of the seal 15.

Referring again to Figs. 2–4, it will be noted that the outer peripheral side surface of the raised central portion 27 of the bottom die member 23 is further provided with circumferentially spaced ribs 30 which project radially outwardly from the side surface of the raised central portion 27 above the shoulder 28 and further protrude vertically upwardly above the top surface 31 of the raised central portion 27. The ribs 30 are formed integral with the raised central portion 27, particularly the outer side surface thereof and the shoulder 28, and provide stamping supporting and positioning means which are in engagement with the inner surfaces of the flanges 18 and 19 of the stamping 17 when the same is positioned about the raised central portion 27 of the bottom die member 23 in preparation for forming a seal 15 as shown in Fig. 2. On the left as viewed in Fig. 2, it will be noted that the portion of the stamping 17 illustrated is substantially spaced from the outer side surface of the raised central portion 27 and the only portions of the stamping in contact therewith are small isolated and circumferentially spaced portions which contact the top and outer side surfaces of the ribs 30. The engagement of the stamping 17 with the ribs 30 is shown in the right hand portion of Fig. 2.

The raised central portion 27 of the bottom die member 23 is centrally recessed axially inwardly from the top surface 31 thereof to define a sealing lip molding cavity 32. The inner side surface of the cavity 32 may take any shape depending upon the desired configuration of the sealing lip portion. As shown in Figs. 2 and 4, the inner side surface of the cavity 32 is provided with a circumferentially continuous, bead-like portion 33 which defines the groove 21 on the outer face of the sealing lip portion 20 of the seal 15. Below the bead-like portion 33 is a frusto-conical surface 34 which in combination with the outer marginal edge portion of the bottom surface 35 defines the outer surfaces of the sealing lip portion 20 as shown in Fig. 1.

The top die member 25, as shown in Figs. 2, 5 and 6, is in the form of a cylindrical plate having an outer depending annular collar 36, an annular groove 37 inwardly of the collar 36 and a downwardly projecting frusto-conical portion 38. The top die member 25 is thus provided with radially spaced cylindrical surfaces 39 and 40 extending axially downwardly from a radially directed connecting surface 41. As particularly shown in Fig. 6, the frusto-conical portion 38 extends downwardly below the bottom surface of the collar 36 and in referring to Fig. 2 it will be noted that the portion 38 is received within the sealing lip forming cavity 32 of the bottom die member 23 with its side surface 40 in spaced relation to the inner side wall of the cavity 32. The bottom surface of the collar 36 is in engagement with the top surface of the stripper ring 24 and the inner surface 39 of the collar 36 is in substantially spaced relation with the outer side surface of the raised central portion 27. Still further, it should be noted that the radially directed surface 41 of the top die member 25 is in substantially spaced relation to the top surface 31 of the raised central portion 27 and the stamping 17 is supported by the ribs 30 in substantially centrally positioned relation with respect to the opposed surfaces of the top and bottom die members.

The top die member 25 is further provided with a plurality of circumferentially spaced pins 42 which are fixedly inserted through the material of the top die member 25 to project into the groove 37 through the radially directed bottom surface 41 thereof. As shown in Fig. 2, the pins 42 engage the top outer surface of the radial flange portion 19 of the stamping 17 to hold the stamping against substantial upward displacement away from the ribs 30 in response to internal molding pressure.

In forming the seal 15 by use of the molding apparatus 22, a quantity of rubber or rubber-like material in the form of a pill 43, as shown in broken lines in Fig. 4, is placed within the sealing lip forming cavity 32 of the bottom die member 23. The stripper plate 24 is placed about the raised central portion 27 and moved into resting engagement with the shoulder 26 as shown in Fig. 2. The stamping 17 is mounted about the raised central portion 27 and held in spaced relation thereto by the ribs 30, these ribs functioning to concentrically position and hold the stamping 17 in proper relation relative to the raised central portion 27. The top die member 25 is then brought into closing and mating relation by a suitable operating mechanism and the depending central portion 38 is received within the sealing lip forming cavity 32 into pressure contact with the pill 43.

The seal forming material is spread by pressure throughout the interior of the mold 22 and flows under pressure into the annular space formed about the raised central portion 27 of the bottom die member 23. The pins 42 hold the stamping 17 against displacement in an upward direction from the ribs 30 in response to the relatively high molding pressure necessary to force the material to flow throughout the cavity portions of the mold. Due to the high molding pressure utilized, if suitable means such as the pins 42 were not provided to prevent displacement of the stamping 17, the pressure could result in displacement of the stamping as well as bending of the radial flange portion 19 to an extent that its position within the body portion of the seal 15 would be adversely affected.

The molding pressure and fitting tolerances of the elements including the stamping 17 are such that a slight spacing results between the stamping 17 and each of the ribs 30 as well as between the bottom surfaces of the pins 42 and the top surface of the flange portion 19. These tolerances are not adequate to allow undesirable displacement of the stamping 17 during the molding operation but are sufficient to provide for the flow of seal forming material between the surfaces of the ribs, pins and stamping to thus completely coat and cover the entire surface portions of the stamping. This is particularly shown in Fig. 1 in the right hand portion thereof wherein a rib forming groove 43 is illustrated as resulting from the positioning of the stamping 17 in close association with a rib 30. The groove 43 extends axially along the inner surface of the body portion 16, but with the tolerances provided, an adequate coating 44 of rubber material covers the surface portion of the stamping 17 initially in contact with the rib 30.

Similarly, as shown in Fig. 1, the pins 42 form recesses 45 in the body portion 16 of the seal 15. However, the bottom surfaces of the recesses 45 are defined by a thin coating of seal forming material which completely covers the adjacent surface portions of the flange portion 19. Thus with the molding apparatus provided, the stamping 17 is completely covered by the material of the seal and no metallic surface portions are exposed for chemical reaction with other substances. Still further, with the complete covering of the stamping 17, there are no exposed separations between the material of the seal and any surface portions of the stamping 17 thus eliminating the possibility of the material of the seal being peeled from the stamping 17 during the use of the seal.

Upon completion of the molding operation, the top die member 25 is withdrawn from mating engagement with the bottom die member 23. The stripper ring 24 is moved upwardly to strip the completed seal from the bottom die member. A thin continuous web of rubber is joined to the inner edge of the sealing lip portion of the seal due to the flow of rubber between the bottom surface of the portion 38 of the top die member and the surface 35 of the bottom die member. To free the sealing lip portion of the seal, this web is removed by trimming.

Figs. 9 and 10 illustrate a modified form of bottom die member 46 which is identical with the bottom die member 23 in all respects previously described except for the stamping supporting rib formations. In view of the substantially identical structural design of the modified die 46, primed reference numerals are used to identify portions thereof which are identical with the previously described bottom die member 23. The shoulder 28' about which the stripper ring 24 is received is provided with circumferentially spaced drilled holes 47, as particularly shown in Fig. 10, into which are received removable pins 48 which extend upwardly along the outer side surface of the raised central portion 27' and project upwardly beyond the top surface 31'. The removable pins 48 thus perform the same function as the ribs 30 previously described and are readily insertable and removable for replacement purposes. Still further, any number of the drilled holes 47 may be provided with certain or all of these holes having inserted therein a pin 48 depending upon the amount of positioning support considered necessary for the particular stamping used.

In Fig. 11 a portion of a seal 15' is illustrated it being understood that this seal is of identical structure as that illustrated in Fig. 1. The seal 15' is provided with a groove 43' made in the inner surface of the body portion 16' by the removable pins 48. When using the bottom die member 46, adequate tolerances exist to provide a thin coating 44' of seal material along the inner surface of the flange portion 18' of the stamping 17'.

As previously described, with the imbedding of the stamping in the body portion of the seal and complete covering of all surface portions of the same, it is unnecessary to subject this stamping to intensive cleaning treatments prior to the use of these same in molding the seal. With the elimination of these preliminary treatments, the overall cost of manufacture is substantially reduced and the ease of manufacture is greatly enhanced. The seal can be formed with a minimum of operational steps, it being necessary merely to insert the stamping and seal material pill within the mold without extensive pre-treatment of the same.

Obviously many modifications and variations of the invention as hereinbefore set forth may be made without departing from the spirit and scope thereof, and therefore only such limitations should be imposed as are indicated in the appended claims.

I claim:

1. Apparatus for forming a radially acting shaft type seal having an annular block-like body portion in which is embedded a reinforcing stamping of generally L-shape cross section and being defined by an axially directed flange integral with a radially inwardly directed flange, the inner periphery of said body portion having integrally formed therewith a radially acting flexible sealing lip portion, said apparatus comprising coacting top and bottom die members, said bottom die member having a raised cylindrical central seal forming portion receiving thereabout in resting engagement with a recessed peripheral shoulder a stripper ring, an inner surface portion of said stripper ring being grooved for cooperation with said bottom die member in forming the body portion of a seal, the outer periphery of said seal forming portion being provided with separate one-piece stamping positioning elements projecting above and radially outwardly therefrom for engagement with the inner surfaces of the flanges of a stamping to space and hold the same circumferentially uniformly out of engagement with the top and outer peripheral surfaces of said seal forming portion, said seal forming portion being centrally recessed to define a sealing lip portion forming cavity, said top die member having an outer depending annular collar receivable about the seal forming portion of said bottom die member in radially spaced relation thereto and in engagement with the top surface of said stripper ring, an annular seal shaping groove inwardly of said collar, and a downwardly projecting portion centrally receivable in the sealing lip portion forming cavity of said bottom die member in radially spaced relation to the inner periphery thereof, said seal shaping groove having downwardly projecting pin means therein for engagement with the outer surface of the radial flange of a stamping and coperating with said stamping positioning elements to hold said stamping within said apparatus to prevent dislocation of the same upwardly from said stamping positioning elements during the application of seal molding pressure.

2. The apparatus of claim 1 wherein said stamping positioning elements are in the form of circumferentially spaced ribs which are integrally formed with said seal forming portion.

References Cited in the file of this patent
UNITED STATES PATENTS

| | | |
|---|---|---|
| 2,249,141 | Johnson | July 15, 1941 |
| 2,279,540 | Voth et al. | Apr. 14, 1942 |
| 2,451,912 | Bradley | Oct. 19, 1948 |
| 2,604,661 | Karns | July 29, 1952 |
| 2,736,583 | Marvin | Feb. 28, 1956 |

FOREIGN PATENTS

| | | |
|---|---|---|
| 1,096,116 | France | June 9, 1955 |
| 698,488 | Great Britain | Oct. 14, 1953 |